Patented Feb. 7, 1950

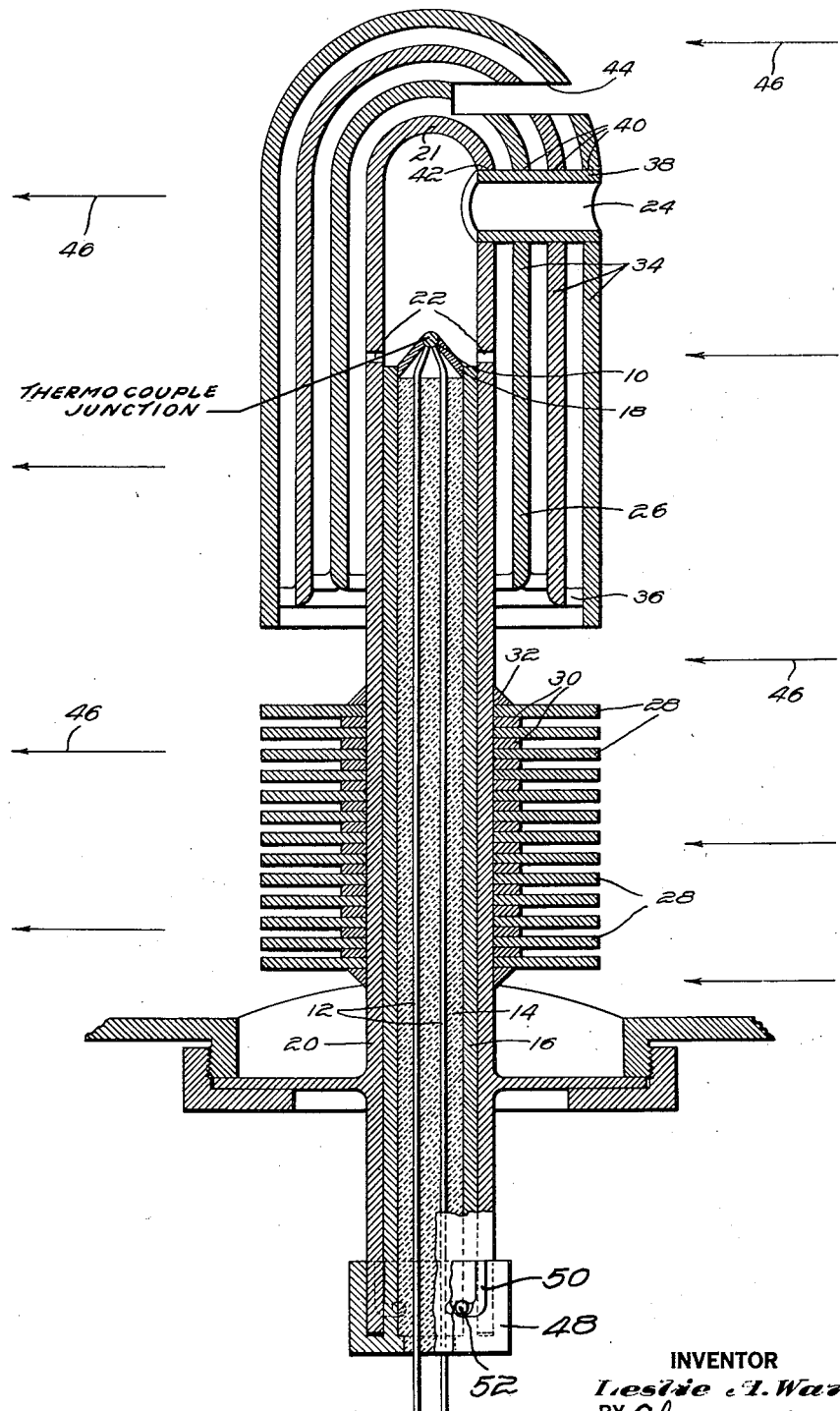

2,496,835

UNITED STATES PATENT OFFICE 2,496,835

GAS TEMPERATURE PROBE OF THE THERMOCOUPLE TYPE

Leslie A. Ward, Hartford, Conn., assignor to United Aircraft Corporation, East Hartford, Conn., a corporation of Delaware Application December 18, 1946, Serial No. 717,068

6 Claims. (Cl. 136—4)

This invention relates to a probe for accurately measuring the temperature of a gas in a rapidly moving stream.

Probes of this character have been developed in which the thermocouple element within the probe has been partially shielded so that it would not lose heat by radiation to the cooler walls of the duct in which the probe is located. In general, however, the shielding has not been sufficiently complete to permit the thermocouple to indicate temperatures within the required accuracy. A feature of this invention is a probe in which the thermocouple is shielded in all directions. Another feature is an arrangement of the shields so that they should all reach substantially the temperature of the gas the temperature of which is being measured.

These probes also lose heat through the stem on which the thermocouple is mounted and a feature of this invention is an arrangement to minimize the loss of heat in this manner so that the indicated temperature may be more nearly accurate.

One feature of the invention is an arrangement to cause a continuous flow of air between the shielding elements for the probe to eliminate any insulating pockets which might affect the accuracy of the thermocouple.

Other objects and advantages will be apparent from the specification and claims, and from the accompanying drawings which illustrate an embodiment of the invention.

The single figure is a sectional view through the probe.

The probe includes a thermocouple element 10 having lead wires 12 mounted in a ceramic tube 14. The ceramic tube is enclosed within a sleeve 16 which supports the thermocouple element at its end, the thermocouple element being preferably mounted within a silver button 18 which closes the end of the sleeve.

The sleeve 16 is preferably slidable within a surrounding sleeve 20 which forms the stem of the probe, the end 21 of the sleeve 20 being rounded and closed and being spaced from the thermocouple element. Adjacent to the thermocouple element and in a position to remain uncovered by the sleeve 16 are spaced bleed passages 22 in the probe stem to permit hot gas entering the end of the stem 20 through a passage 24 to escape into the space between the outer surface of the stem 20 and a cup-shaped shield 26.

To minimize the heat transfer along the stem and to keep the inner end of the stem 20 as close as possible to the temperature of the gas in which the probe is located, the stem has a large number of spaced discs 28 which may be held in spaced relation by washers 30 and may be mounted on the stem by welds 32. These discs approach the temperature of the gas in which the probe is located and tend to keep the probe stem at a temperature close to that of the gas.

For the purpose of more completely shielding the thermocouple element 10, the stem 20 is shielded by several spaced, cup-shaped shields 34 which minimize radiation from the thermocouple element 10 or from the inner rounded end 21 of the stem 20 to the outer walls of the duct in which the gas being measured is located. The shields may be held in spaced relation to each other by tabs 36 on the edges of the cup-shaped shields which engage with the stem and with the adjacent shields. The shields may further be held in spaced relation by a sleeve 38 which defines the passage 24 and which engages with aligned openings 40 in the shields and an opening 42 in the stem. The shields 34, stem 20, and discs 28 may be formed of any suitable heat resistant material, such as certain of the stainless steels or the well-known non-ferrous high temperature materials.

In addition to the flow of hot gas into the end of the stem 20 through the passage 24, the gas may enter between adjacent shields through a slot 44 which permits the gas to enter the space between each pair of shields and which is preferably arranged to face in the direction opposite to the flow of gas, which is indicated by the arrows 46.

With this arrangement the thermocouple element is shielded against radiation in all directions and is still exposed to the temperature of the gas in the duct since a small part of the gas flows through the passage 24 and discharges through the openings 22 into the space between the stem and the innermost shield. For further minimizing the loss of heat at the thermocouple element, the several shields 34 are kept at a temperature close to that of the gas by the flow of a small part of the gas between each pair of shields.

The thermocouple element is replaceable in the probe by withdrawing the sleeve 16 from the surrounding sleeve 20. Thus, if the thermocouple junction, for example, becomes loose or if any other difficulty occurs, the thermocouple assembly within the sleeve 16 may be detached, as for example, by the use of a releasable connection in the form of a coupling 48 mounted on the outer end of the sleeve 16 and having a slot 50 engaging over a pin 52 on the sleeve 20. Since this coupling is located externally of the gas duct, it is possible to withdraw the sleeve 16 with the thermocouple therein and replace it without removing the probe from its position within the duct.

It is to be understood that the invention is not limited to the specific embodiment herein illustrated and described, but may be used in other ways without departure from its spirit as defined by the following claims.

I claim:

1. In a gas probe adapted to be inserted in a gas stream, a tube in which a thermocouple junction may be positioned, said tube having a closed end and a number of cup-shaped shields spaced from each other and in nested arrangement over the closed end of the tube, said shields and tube having aligned openings at right angles to the axis of the tube and shields and adjacent to the closed end of the tube for the admission of gas from the stream into the tube.

2. In a gas probe adapted to be inserted in a gas stream, a tube in which a thermocouple junction may be positioned, said tube having a closed end, and a number of cup-shaped shields in nested arrangement over the closed end of the tube, said shields having aligned openings at right angles to the axis of the tube and shields for the admission of gas from the stream to the spaces between the shields, the open ends of the shields being spaced from each other for the escape of gas from between the shields.

3. In a gas probe, a tube, a thermocouple junction positioned therein at a predetermined location, said tube having a closed end, and a number of cup-shaped shields spaced from each other and in nested arrangement over the end of the tube, said shields and tube having aligned openings for the admission of gas into the tube, said tube having spaced openings adjacent to the location of the thermocouple junction for the escape of hot gas therefrom.

4. In a gas probe, a tube in which a thermocouple junction may be positioned at a predetermined location, said tube having a closed end and a number of cup-shaped shields spaced from each other and in nested arrangement over the closed end of the tube, said shields and tube having aligned openings for the admission of hot gas from outside the shields into the tube, and a sleeve inserted in the openings to guide the flow of gas into the tube, said tube having discharge openings adjacent to the location of the thermocouple junction.

5. In a gas probe adapted to be positioned in a gas stream, a tube in which a thermocouple junction may be positioned, a number of cup-shaped shields spaced from each other and in nested arrangement over the end of the tube, said shields and tube having aligned openings at right angles to the axis of the tube and shields for the admission of gas from the stream into the tube, and a number of spaced discs on the tube located in the same gas stream as the rest of the probe.

6. In a gas probe adapted to be positioned in a gas stream, a tube in which a thermocouple junction may be positioned, said tube having a closed end, and a number of cup-shaped shields spaced from each other and in nested arrangement over the closed end of the tube, said shields and tube having aligned openings for the admission of hot gas from the gas stream outside the shields into the tube, said shields having other aligned openings for the admission of gas from the gas stream into the spaces between the shields, and said tube having openings for the discharge of the hot gas therefrom.

LESLIE A. WARD.

REFERENCES CITED

The following references are of record in the file of this patent:

UNITED STATES PATENTS

| Number | Name | Date |
|---|---|---|
| 1,478,821 | Foster | Dec. 25, 1923 |
| 1,559,381 | Swoboda | Oct. 27, 1925 |
| 1,791,020 | Wilson | Feb. 3, 1931 |
| 2,291,448 | Bragg | July 28, 1942 |
| 2,304,489 | Wetzel | Dec. 8, 1942 |
| 2,414,370 | Floyd | Jan. 14, 1947 |
| 2,461,801 | Armstrong | Feb. 15, 1949 |

FOREIGN PATENTS

| Number | Country | Date |
|---|---|---|
| 320,194 | Great Britain | Oct. 10, 1929 |

OTHER REFERENCES

King, W. J., Trans. A. S. M. E. vol. 65 (1943), pages 423–4–5.

Wimmer, W, N. A. C. A. Tech. Memo. 967, Jan. 1941, pages 26 and 38.